(No Model.)
H. FALKENSTEIN.
TOOTHPICK.
No. 553,610.     Patented Jan. 28, 1896.
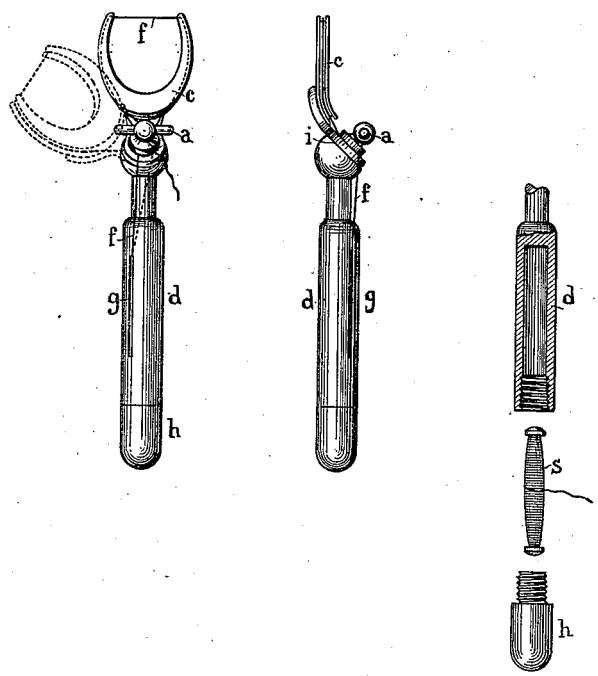
Witnesses:
Richard Weylandt.
Richard Kraemer
Inventor:
Hermann Falkenstein

UNITED STATES PATENT OFFICE.

HERMANN FALKENSTEIN, OF BERLIN, GERMANY.

TOOTHPICK.

SPECIFICATION forming part of Letters Patent No. 553,610, dated January 28, 1896.

Application filed February 25, 1895. Serial No. 539,634. (No model.)

*To all whom it may concern:*

Be it known that I, HERMANN FALKENSTEIN, a subject of the Emperor of Germany, residing at Berlin, Germany, have invented certain new and useful Improvements in Tooth-Picking Apparatus, of which the following is a specification, reference being had therein to the accompanying drawings.

My invention relates to an improved toothpicking apparatus which permits the picking of the teeth by means of a thread; and the object of my improvement is to provide an apparatus by which a reliable picking of the teeth, especially of clenched teeth, is secured and by which the enamel and the gum of the teeth are not so affected as by tooth-brushes and tooth-pickers commonly in use.

In order that my invention may be thoroughly understood, I will now describe it in detail, referring in so doing to the accompanying drawings, which are to be taken as part of this specification and read therewith, but not as limiting the invention to the particular combination illustrated.

Figure 1 is a front view, and Fig. 2 a side view, of the improved tooth-picking apparatus. Fig. 3 is a sectional elevation of the handle-shaft. The bobbin and screw-plug are shown apart in side views.

Similar letters refer to similar parts throughout the several views.

The improved tooth-picking apparatus consists of a handle $d$ slanting at its upper end at $i$, to which a bifurcated arm $c$ is connected by means of a suitable set-screw $a$, so that said arm $c$ may be adjusted and clamped in any desired position upon the slanting end of the handle, made hollow for this purpose, as shown, Fig. 1, by dotted lines, the apparatus thus being fit for cleaning front teeth as well as jaw-teeth.

Into the interior of the handle $d$ is placed a spool or bobbin $s$, the antiseptic silk thread $f$ of which, passing through a slot $g$ of the handle and by the bolt and beneath the collar of screw $a$, is put into suitable grooves provided at the outer edge of the bifurcated arm $c$ and extends freely from one end of this arm to the other. The free end of the thread passes likewise by the bolt and beneath the collar of screw $a$, so as when stretching the thread and then clamping the screw the thread will be held in the stretched condition and will be ready for use, as shown in Fig. 1. The stretched part of the thread $f$ between the branches of the arm $c$ may then be used, as will be easily understood from the drawings, as a tooth-picker by bringing this stretched thread into the spaces between the teeth. The spool or bobbin $s$ carrying the thread may be held in its proper position by means of a suitable screw-plug $h$ screwed into the lower end of the hollow handle $d$.

Having fully described my invention, what I claim, and desire to secure by Letters Patent, is—

1. In a tooth pick the combination of a handle slanting at one end, a bifurcated arm adjustably connected to the slanting end of the handle and adapted to carry a thread, and means for clamping the handle to the said bifurcated arm, all substantially as set forth and for the purposes specified.

2. In a tooth pick the combination of a hollow handle slanting at one end and containing a spool for receiving a thread, a slot provided in the handle wall for passing the thread out of the handle, a bifurcated arm adjustably connected to the slanting end of the handle and adapted to carry the free end of the thread, and means for clamping the handle to the said bifurcated arm, all substantially as set forth and for the purposes specified.

In testimony whereof I have affixed my signature in presence of two witnesses.

HERMANN FALKENSTEIN.

Witnesses:
RICHARD WEYLANDT,
RICHARD KRAEMER.